United States Patent [19]

Motoyama et al.

[11] Patent Number: 4,837,758

[45] Date of Patent: Jun. 6, 1989

[54] MAGNETO-OPTICAL RECORDING REPRODUCING DEVICE HAVING FIELD APPLYING MEANS

[75] Inventors: Kazuyasu Motoyama, Hachioji; Tsuneo Yanagida, Hino; Mitsugu Sakai, Hachioji; Hitoshi Ichikawa, Machida; Akihiko Yoshizawa, Hachioji; Seizou Watanabe, Hachioji; Takeaki Nakamura, Hino, all of Japan

[73] Assignee: Olympus Optical Co., Ltd., Tokyo, Japan

[21] Appl. No.: 909,355

[22] Filed: Sep. 19, 1986

[30] Foreign Application Priority Data

Sep. 20, 1985 [JP] Japan .................. 60-207954

[51] Int. Cl.$^4$ ........................................... G11B 13/04
[52] U.S. Cl. ..................... 369/13; 360/132; 360/133; 369/292
[58] Field of Search ............ 360/60, 59, 132, 133, 360/114; 369/77.2, 13, 14, 292; 365/122

[56] References Cited

U.S. PATENT DOCUMENTS 4,706,232 11/1987 Funada et al. ............... 369/13
4,740,937 4/1988 Watanabe ..................... 369/13

FOREIGN PATENT DOCUMENTS 60-160082 8/1985 Japan ..................... 369/292
61-192084 8/1986 Japan ..................... 360/132
2133914 8/1984 United Kingdom .

OTHER PUBLICATIONS

Hatchett, IBM Tech. Dis. Bulletin, vol. 23, No. 4, Sep. 1980, pp. 1652–1653.

Primary Examiner—Alan Faber
Assistant Examiner—Hoa T. Nguyen
Attorney, Agent, or Firm—Armstrong, Nikaido, Marmelstein, Kubovcik & Murray

[57] ABSTRACT

In the present invention, a discriminating means of recording media is formed in a cartridge containing a magneto-optical type recording media and in a cartridge containing other recording media, a sheltering height of a field applying means is changed according to the loading of each cartridge so that said field applying means is held close to the recording media in the case of the magneto-optical type cartridge while said means is sheltered high in the case of other type cartridge, and at the same time a discriminating means for recording media is provided to perform the signal processing corresponding to the recording media loaded.

7 Claims, 8 Drawing Sheets

MAGNETO-OPTICAL RECORDING REPRODUCING DEVICE HAVING FIELD APPLYING MEANS

FIELD OF THE INVENTION AND RELATED ART STATEMENT

The present invention relates to an optical recording and reproducing device enabling the drive of an optical disk and of a magneto-optical disk.

In recent years remarkable development in the industry related to information has occured and the quantity of information being treated tends to increase rapidly. Therefore an optical (information) recording and reproducing device, capable of recording at a high density and/or reproducing at a high speed by means of optical head (or optical pickup) using light instead of the conventional head recording and reproducing information by means of magnetic head, has come to public notice.

As to the recording media used in the above-mentioned optical recording and reproducing device, for example an optical disk of air after writing type, namely a pit forming type, and a magneto-optical type disc, namely one using a magneto-optical effect, have come to be widely used.

Figure 1:
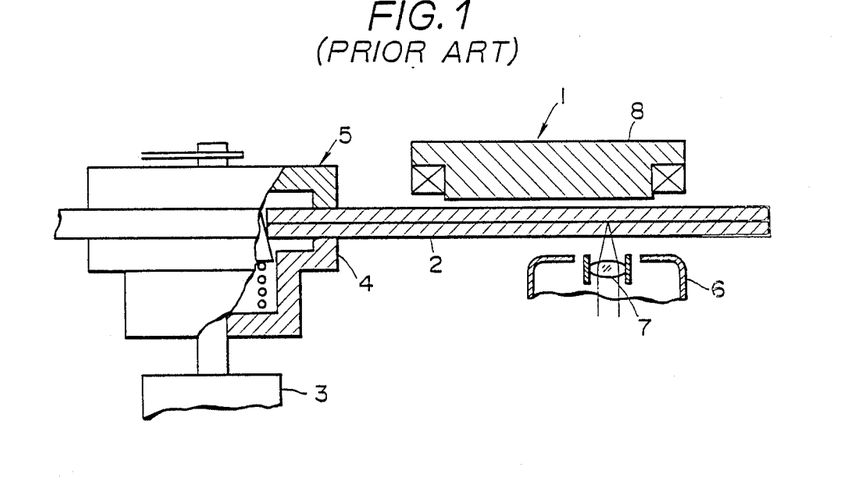
FIG. 1 illustrates a part of a recording and reproducing device of the prior art for a magneto-optical disk.

The recording and reproducing device 1 of said magneto-optical disk of the prior art as shown in FIG. 1 is so configured that a magneto-optical disk 2 is placed on a turntable 4 driven by a spindle motor 3 and is clamped free to rotate by a disk clamping member 5, and that the magneto-optical disk 2 can be irradiated by a light beam emitted from a laser diode, or the like, fixed in a pickup 6 placed opposite to the magneto-optical disk 2 and focused by an objective lens 7.

Opposite to the surface (on the reverse side of the pickup 6) of the above-mentioned magneto-optical disk 2 is equipped with a field coil 8 as a means of applying magnetic field, which makes possible applying a mutually reverse magnetic field to the recording unit of the magneto-optical disk 2, depending on whether the said device is in recording or erasing mode.

Further, since a fairly strong magnetic field is required for the recording or erasing process described above, the field coil 8 is equipped in a nearly close adhesion state to the magneto-optical disk 2.

Moreover, since a considerably strong magnetic field is also needed to be applied for the case in which the magneto-optical disk 2 can be recorded on both sides, the disc is so made that its overall thickness is thin.

Figure 2:
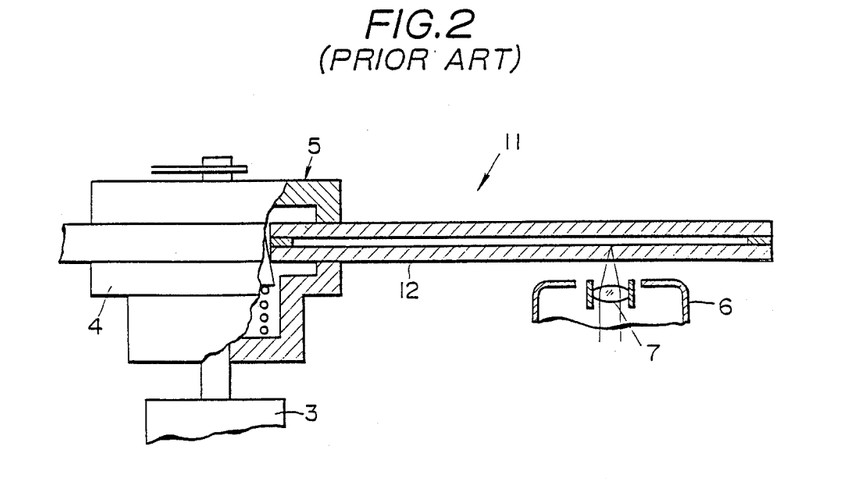
FIG. 2 illustrates a part of a recording and reproducing device of the prior art for an optical disk.

On the other hand, in the recording and reproducing device for the optical disk 11 shown in FIG. 2, since the optical disc 12 is of a pit forming type and gas is generated in the process of recording by forming pits, a space is needed between the two disc forming members by means of a spacer, which increases the overall thickness of the optical disk.

When the same disk drive device is to be shared for the above-mentioned magneto-optical disk 2 as well as for the optical disk 12, in the case of loading of an optical disk, due to its thickness, a means is needed to prevent the collision of the optical disk against the field coil for the magneto-optical disk; however, since the prior art was designed for the exclusive use of either a magneto-optical disk or an optical disk, a combined usage was impracticable.

OBJECT AND SUMMARY OF THE INVENTION

The object of the present invention is to provide an optical recording and reproducing device that can perform the prescribed loading regardless of the cases in which either a magneto-optical disk or optical disk of the other sort is loaded in said device.

The other object of the present invention is to provide an optical recording and reproducing device that can perform the prescribed loading by judging automatically between a magneto-optical disk and other sorts of an optical disk, and that is also capable of performing the signal processing appropriate to the disk loaded in said device.

In the present invention, a means of discriminating a magneto-optical disk from an optical disk of another sort is provided in a part of the cartridge containing a disk, and using said discriminating means, the field applying means is sheltered by the cartridge loaded; at the same time the height of sheltering is set low for a magneto-optical disk and high for optical disks other than a magneto-optical disk, which enables the loading of any sort of optical.

BRIEF DESCRIPTION OF THE DRAWINGS

FIG. 3 to FIG. 10 relate to the first embodiment of the present invention.

FIG. 3, A and B, shows a perspective of a disk cartridge provided with a slotted part for discrimination and a field applying means capable of sheltering by rotation.

FIG. 7, (a) through (d), shows wave forms of signal output wave forms at various parts of a signal processing circuit.

FIGS. 11 through 14 relate to the second embodiment of the present invention.

FIG. 11, A and B, shows a perspective of a disk cartridge and of a field applying means in the second embodiment of the present invention.

DETAILED DESCRIPTION OF THE PREFERRED EMBODIMENTS

Figure 4:
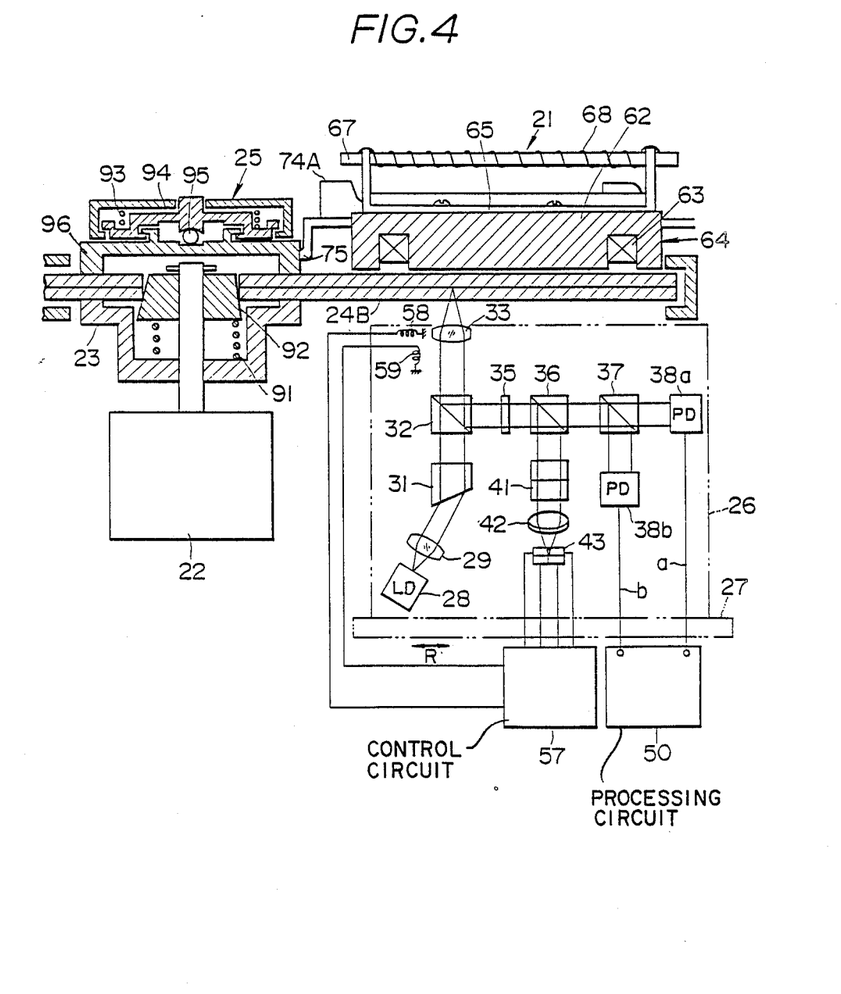
FIG. 4 shows a configuration of the optical system of the first embodiment.

The optical system of the optical recording and reproducing device 21 of the first embodiment is so configured as shown in FIG. 4.

Namely a turntable 23 driven by a spindle motor 22 is so provided that an optical disk 24A or a magneto-optical disk 24B can be placed on it. (Both of the disks are hereafter called simply disk 24). The disk 24 placed on said turntable 23 is clamped free to rotate by a clamping member 25 that can ascend and descend freely from the upper side.

A (an optical) pickup 26 is equipped opposed to one side of said disk 24, and the pickup 26 is secured on a carriage 27 acting as a moving pedestal, and the carriage 27 is so provided as to be capable of moving in a radial direction R of the disk 24 by a voice-coil motor or the like not shown in the Figure.

A laser diode 28 is contained in said pickup 26 as a monochromatic light source, the light emitted from the laser diode 28 is transformed into a parallel flux by a collimator lens 29, and after that the flux is transformed into a light beam having a circular cross section by a forming and polarizing prism 31 and at the same time is polarized, passes through a beam splitter 32, and after passing through an objective lens 33 it is focused and irradiated as a spot on the surface of the disk 24.

As to the light beam irradiated on said disk 24, if the disk 24 is a magneto-optical disk 24B, the vibrating plane of the reflected wave is rotated clockwise or counterclockwise by a small angle $\theta$ due to the Kerr effect depending on whether the irradiated spot is magnetized to S pole or N pole (the angle between the two vibrating planes is $2\theta$), and the reflected wave passes through the objective lens 33, a part of the wave is reflected by the beam splitter 32 and comes to be incident on a half-wave plate 35.

After passing through said half-wave plate 35, the light is split into transmitted light and reflected light by the beam splitter 36, and the transmitted light is further split into transmitted light and reflected light by a polarizing beam splitter 37 and received by PIN photodiodes 38$a$, 38$b$, and the reproduced signal of the recorded information on the disk 24 is formed from the output of diodes 38$a$, 38$b$.

On the other hand, the greater part of the reflected light from said beam splitter 36 is reflected toward a critical angle prism 41, and after passing through a condenser 42 it is received by a quadripartite photo detector 43, and a control signal if formed from the output of the detector 43.

Figure 6:
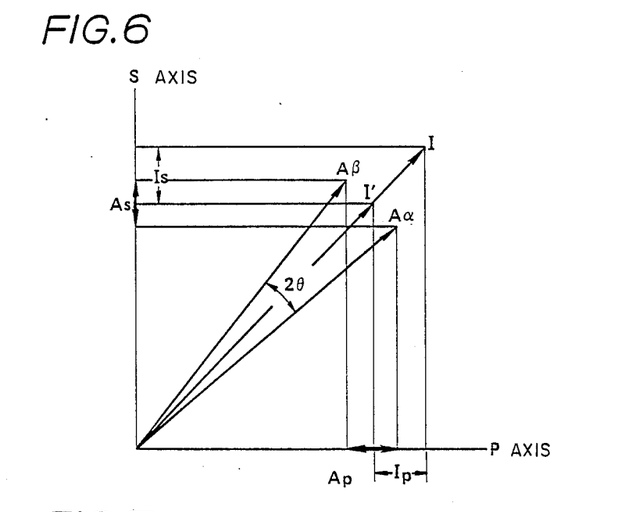
FIG. 6 illustrates a polarization direction and the like of the reflected light on a magneto-optical disk.

Meanwhile since the light that is reflected by the said disk 24 and passed through the half-wave plate 35 is so set that its vibrating plane is pointed to the central direction between the S axis and P axis of the polarizing beam splitter 37, if the disk 24 is a magneto-optical disk 24B the intensity of the light incident on the side of the polarizing beam splitter 36 is either A$\alpha$ or A$\beta$ shown in FIG. 6 depending on whether the light is reflected from S pole or N pole.

Figure 7:
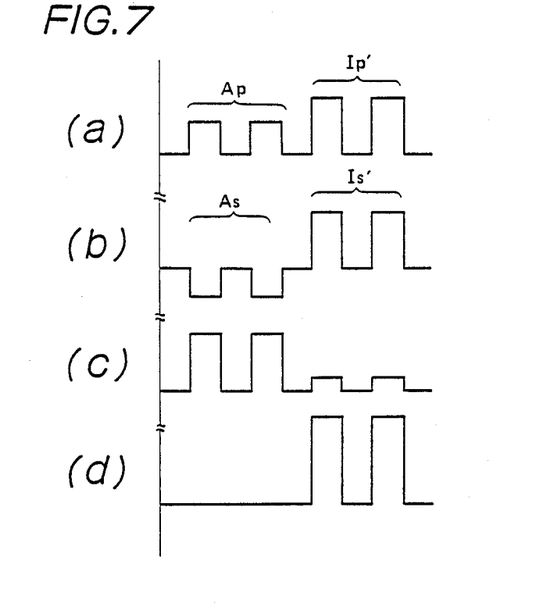

Therefore, by passing through the polarizing beam splitter 37 functioning as a light detector, the P axis component and the S axis component are received by the PIN photodiodes 38$a$, 38$b$, respectively. In this case, since the magneto-optical disk 24B is rotated by the spindle motor 22, the magnetizing direction of the spot irradiated by the light beam reverses according to the recorded information, and the modulated light varying with the difference between the P axis components of A$\alpha$, A$\beta$ (shown by a code Ap) is incident on the PIN photodiode 38$a$, and a photo-, electric conversion signal a corresponding to the said intensity difference Ap as is shown in FIG. 7$a$ is output from the PIN photodiode 38$a$. On the other hand, the modulated light corresponding to the difference between the S axis components of A$\beta$, A$\alpha$ (shown by a code As) is incident on the PIN photodiode 38$b$, and a photoelectric conversion signal b corresponding to the said intensity difference As as shown in FIG. 7$b$ is output from the PIN diode 38. Therefore, by passing the signal b through a subtractor (or a differential amplifier) 51 of the signal processing circuit 50 shown in FIG. 5, the signal corresponding to the recorded information by a magneto-optical system shown in FIG. 7$c$ can be obtained.

In the meantime, when information is recorded on said magneto-optical disk 24B, a track number and a sector number are formed by pits (called prepits) in each track or in each sector, namely a partitioned unit of a track, respectively.

Hence in the case of said magneto-optical disk 24B, if a prepit part is irradiated by a light beam a change in the intensity of the reflected light occurs depending on the presence or absence of a pit, which is represented by the vectors shown by codes I, I' in FIG. 6. Consequently the intensity of light received at each photodiode 38$a$, 38$b$ in said optical system is equal to the components represented by codes Ip, Is in FIG. 6, and the output from each photodiode 38$a$, 38$b$ has the value multiplied by a factor proportional to the above-mentioned Ip, Is, which are represented by codes Ip', Is' in FIG. 7$a$, 7$b$.

Figure 5:
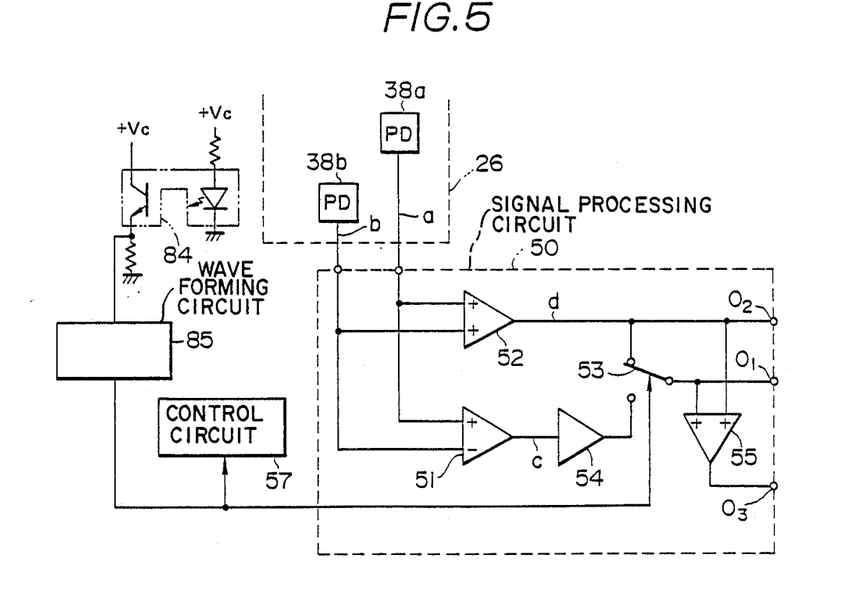
FIG. 5 shows a block diagram of a signal processing circuit.

The intensity modulated light whose intensity varies depending on the said pit is passed through an adder 52 shown in FIG. 5 to obtain a signal having a large amplitude as shown in FIG. 7$a$, 7$b$.

In the reproduction of the magneto-optical disk 24B of the said magneto-optical system, the prepit signal is output from the adder 52, while the information data is output from a subtracter 51.

On the other hand, in the case of the optical disk 24A, both of the prepit signal and the information data are output from the adder 52.

For this reason an analogue switch 53 is switched on and off according to the disks used, 24A or 24B, and the circuit is so configured that the information data signal is output from a data output terminal 0, through the (analog) switch 53. Moreover, since the output signal amplitudes from said adder 52 and subtracter 51 differ from each other (generally the output level on the side of the subtracter is lower), the output from the subtracter 51 is amplified by an amplifier 54 to equalize the levels. (Namely the level corresponding to a high level is adjusted to have the normal high level value.) Further as to the output from said adder 52, the ID data signal such as track numbers and the like are output from the output terminal $O_2$ separately from the information data signal. The outputs from said two output terminals $0_1$, $0_2$ are passed through the adder 55, and the levels of the output terminal $0_3$ are set at the same standard signal level and are outputted.

Meanwhile, as to the output from the quadripartite photodetector 43, a pair of signal outputs from each of the two vertically partitioned sections in the four photodetectors shown in FIG. 4 (the outputs from the upper side and lower side photodetectors are added) and a pair of signal outputs from each of the two horizontally partitioned sections (the outputs from the right side and left side photodetectors are added) are passed through a differential amplifier respectively to obtain a tracking error signal utilizing a track group and a focusing error signal due to the critical angle method. Each of these signals is passed through a control circuit 57 comprising their respective phase compensation circuit, gain adjusting amplifier and driving circuit, and is applied respectively to a tracking coil 58 and a focusing coil 59 that enable fine adjustment of an objective lens 33.

Figure 3A:
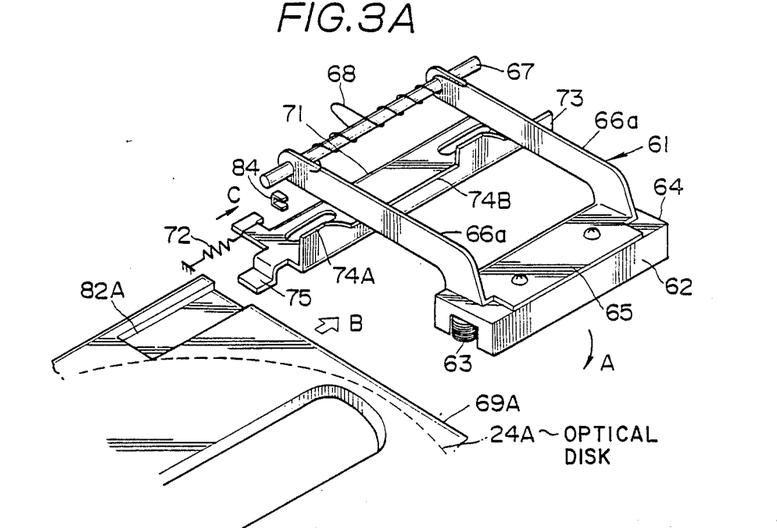
Figure 3B:
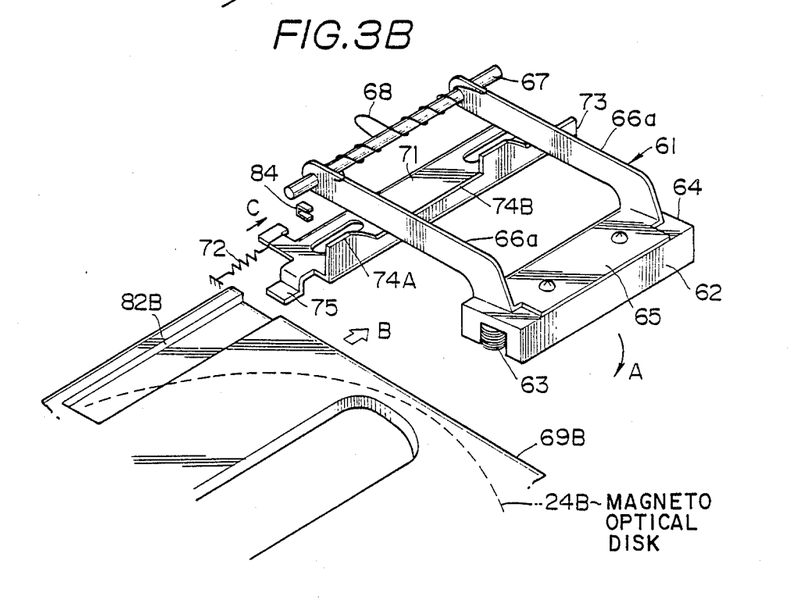

Meanwhile the recording and reproducing device 21 of the first embodiment is equipped with a field applying member 61, for example the one shown in FIGS. 3A and B to enable the execution of not only the reproducing but also the recording and erasing when the magneto-optical disk 24B is loaded. Namely, a coil 63 is attached to a field yoke 62 having a nearly E-shaped cross section to form a field coil 64. A yoke fixing member 65 is secured to the upper surface of the said yoke 62, and a pair of levers 66a, 66a protruding to the perpendicular direction with respect to the longitudinal direction of the yoke 62 is jointly formed with the member 65 and a freely rotatable axis 67 is attached to the points of the both lever 66a, 66a.

A coiled spring 68 is wound around said axis 67, and the coiled spring 68 energizes the field coil 64 side to effect rotating power in the direction A to which the field coil 64 is moved downward with respect to the axis 67. Further, the ends of the axis 67 are secured to, for example, equipment, container, or the like around it.

In the meantime, in the first embodiment, for both of the case in which either the optical disk 24A or the magneto-optical disk 24B is used, a means is provided so that the magneto-optical disk and the optical disk of other sorts are discriminated in the course of the loading process that load the disk from the insertion aperture to the prescribed loading position, and that the ascent and descent of the field coil is controlled to enable setting at a prescribed loading state.

Namely, directly under said one pair of levers 66a, 66a and over the upper surface of a cartridge holder 70 as a guiding member for the insertion of the disk cartridge 69 (a general term for 69A, 69B) containing the disk 24, a lever 71 is equipped in the horizontal direction perpendicular to the longitudinal direction of these levers 66a, 66a, namely in the direction which the disk 24 is moved in to be inserted for the loading of the disk 24, and the lever 71 is held resiliently by a spring 72, and using a force opposing to the resilient force the disk 24 can be shifted along the direction B to which the disk 24 is inserted.

A side part in the longitudinal direction of the said level 71 is bent to stand up rectangularly an to form a bent erect part 73, further a high edge part 74A and a low edge part 74B are formed on the upper edge of the bent erect part 73. And the backward end (or the left side end in FIG. 3) of the said lever 71 is bent downward with a step to form a coupling insert tip 75 for the discrimination of disks. This coupling insert tip 75 is so made as to protude downward from the upper surface of the cartridge holder 70 and to be placed on (the upper part position of) the insert guide path of the disk cartridge 69. (See FIG. 8)

The levers 66a, 66a supporting said field coil 64 are ordinarily butted at the low edge part 74B of the lever 71 as shown in FIG. 3, and the field coil 64 is held rotatably at a low angle position. Meanwhile if said lever 71 is shifted (for example pushing the coupling insert tip 75) in the direction arrowed by C opposing the energizing force of the spring 72, each lever 66a, 66a come to be held butted on the high edge part 74A starting from the low edge part 74B and passing through the slanted part. At this state the field coil 64 is shifted rotatably upward, and if a thick optical disk 24A is inserted, the field coil 64 are so disposed as not to hinder the insertion.

In the meantime the optical disk 24A or the magneto-optical disk 24B is contained in the disk cartridge 69 respectively.

As to said cartridge 69, the disk cartridge 69A containing the optical disk 24A, or the disk cartridge 69B containing the magneto-optical disk 24B is, as shown in FIG. 3A or FIG. 3B, provided with a slotted part (or a concave part) used to judge (discriminate) the respective disks 24A, 24B at the portion where it opposes the coupling insert tip 75 of the said lever 71.

Figure 8:
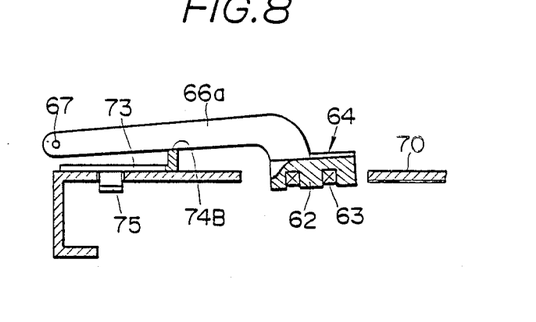
FIG. 8 shows a schematic cross section about the positional relationship between a cartridge holder and a field applying means before the insertion of a disk cartridge.
Figure 9:
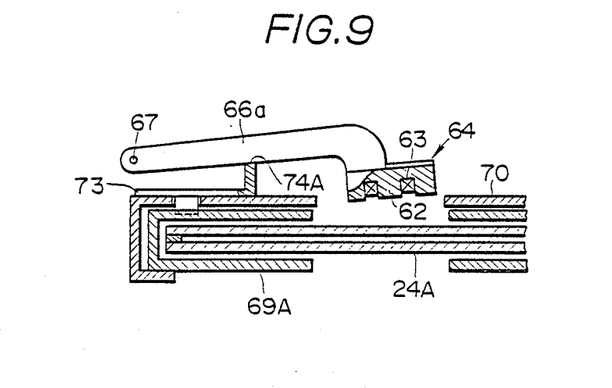
FIG. 9 shows a schematic cross section of the status of an optical disk loaded at a prescribed state.

The length of the slotted part 82A of the said disk cartridge 69A containing the optical disk 24A is formed long, while the length of the slotted part 82B of the disk cartridge 69B containing the magneto-optical disk 24B is formed short. Therefore, when the said disk cartridge 69A or 69B is inserted from the insertion aperture for disk cartridge to record or to reproduce or the like by loading to the recording and reproducing device, since the length of the slotted part 82A for the disk cartridge 69A is short, the coupling insert tip 75 of the lever 71 moves along the slotted part 82A to collide with the deepest wall part, with the result that the lever 71 is pushed up and is shifted. By this shift levers 66a, 66a become positioned on the high edge part 74A starting from the state in which they are held on the low edge part 74B of the lever 71 and passing through the slanted part, and the field coil 64 is rotatably sheltered upward. Namely, when the disk cartridge 69A containing the optical disk 24A is inserted, the lever 71 starts to shift at the position before the collision of the tip of the disk cartridge 69A against the field coil 64, the field coil 64 is rotatably sheltered upward by the shift of the lever 71, and the disk cartridge can be inserted as far as the normal inserting position. When the disk cartridge 69A is inserted as far as the normal insertion position, it is shifted downward with a cartridge holder 70 by a shifting mechanism not shown in the Figure as shown in FIG. 8 and is set the prescribed loading position. This state is shown in FIG. 9.

Figure 10:
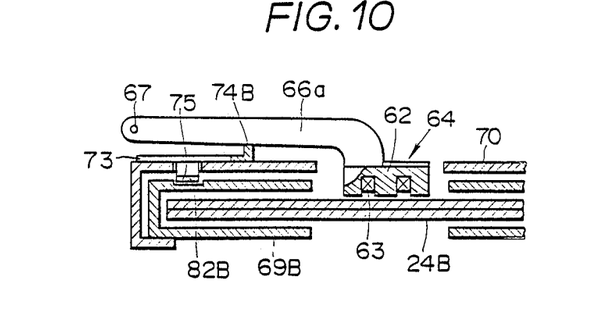
FIG. 10 shows a schematic cross section of the status of a magneto-optical disk loaded at a prescribed state.

On the other hand, since the disk cartridge 69B is provided with a long slotted part 82B, when the disk cartridge 69B is inserted to the cartridge holder 70, even when it is inserted to the prescribed insertion position the coupling insert tip 75 of the lever 71 stays within the slotted part 82B and the lever 71 is held at the immovable state. Namely, a pair of levers 66a, 66a remain in at the state supported by the low edge part 74B of the lever 71. And when the disk cartridge 69B is inserted to the normal insertion position, it descends downward with the cartridge holder 70 by a shifting mechanism not shown in the Figure, and after its descent, since the height of the low edge part 74B supporting the levers 66a, 66a is lower compared than the axis 67, the field coil 64 descends rotating with said axis 67 as a center of rotation, and the field coil 64 is set to the prescribed loading position close to the magneto-optical disk 24B as shown in FIG. 10 to enable setting at a state in which a necessary field can be applied for the recording or the erasing of the magneto-optical disk 24B.

Further a photo interrupter 84 is provided near the position where the said lever 71 is resiliently fixed by, for example, a spring 72, and when the disk cartridge 69A containing the optical disk 24A is inserted and the lever 71 is shifted to the C-arrowed direction, the light incident on the photodetector to the photo interrupter 84 is interrupted to output a discriminating signal. The level of this discriminating signal is low in the case of the insertion of (the disk cartridge 69A containing) the optical disk 24A, and is high in the case of the insertion of (the disk cartridge 69B containing) the magneto-optical disk 24B, and this output is used, by being passed through a wave forming circuit as shown in FIG. 5, to control the switching of the analog switch 53 in the signal processing circuit 50, and to set the gain selection not shown in the Figure of the control circuit 70. For example, it is so provided to set the gain selection of the gain adjusting resistance for the focusing control or the tracking control as to be suited to the disk actually loaded. Also, said discriminating signal provides a state in which current can be supplied to the coil 63 in the case of the loading of the magneto-optical disk 24B, but current is held off in the case of the optical disk 24A.

Meanwhile the clamping member 25 is placed on the turntable 23 as shown in FIG. 4, and on the upper surface of the disk 24B whose central hole contains a cone 92 energized upward by a spring 91 the clamping member 25 is so arranged as to enable fixing the disk 24B free to rotate by pressing a clamper 96 downward using an intermediate member 94 and a ball 95 pushed by a spring 93.

In the above-mentioned first embodiment, as a means of discriminating the optical disk 24A from the magneto-optical disk 24B, the disk cartridge 69A containing the optical disk 24A is provided with the short slotted part 82A, the disk cartridge 69B containing the magneto-optical disk 24B is provided with a long slotted part 82B, and the coupling insert tip 75 is placed on the guide path in which these disk cartridges 68A, 68B are inserted, and in the case of the short slotted part 82A, said coupling insert tip 75 is pushed to shift the lever 71 causing the field applying member 61 to rotate upward.

Therefore, this first embodiment enables any of said two disk cartridges 69A, 69B to be loaded. Also in the process of loading, the disk loaded is judged to set the control system or the data information signal level at an appropriate state, and the recording, reproducing, or erasing can be done for both sorts of the disks.

Figure 11A:
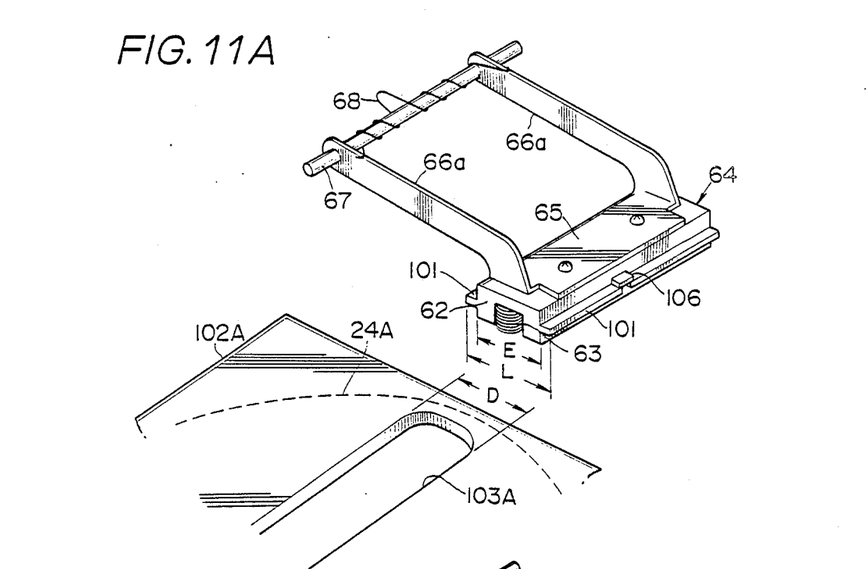
Figure 11B:
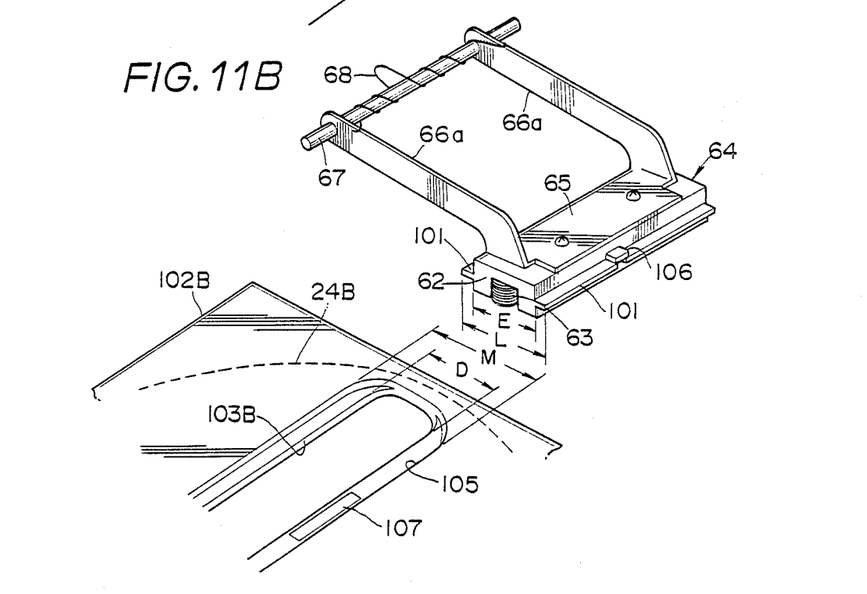

FIG. 11 shows the principal part of the second embodiment of the present invention.

In the second embodiment, protruded edges 101, 101 are provided on both sides of the yoke 62 of the first embodiment.

Figure 13:
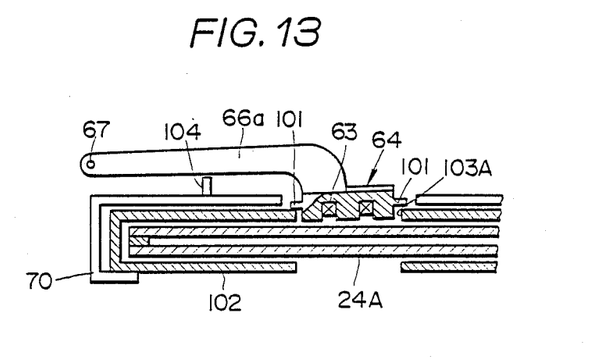
FIG. 13 shows a schematic cross section of the status of the status of an optical disk loaded at a prescribed state.

Meanwhile, the width D of the rectangular aperture 103A for the recording and reproducing (and also for erasing) in the disk cartridge 102A containing an optical disk 24A is made narrower than the width L between the said both protruded edges 101, 101 (namely so provided as to satisfy L > D). Hence if the disk cartridge 102A is inserted and thereafter descended downward with the cartridge holder 70 and set to the prescribed loading state (see FIG. 13), the levers 66a, 66a supported by a protruded edge 104 on the upper surface of the cartridge holder 70 is rotated around the axis 67 to cause the field coil 64 to descend, but since the width L between the both protruded edges 101, 101 is greater than the width D of the aperture 103A, the two protruded edges are butted to the side edges of the aperture 103A, (since the upper surface position of the optical disk is higher than that of the magneto-optical disk 24B, the butting takes place at a higher position), hence the field coil 64 is so provided as not to collide with the surface of the optical disk 24A.

Figure 14:
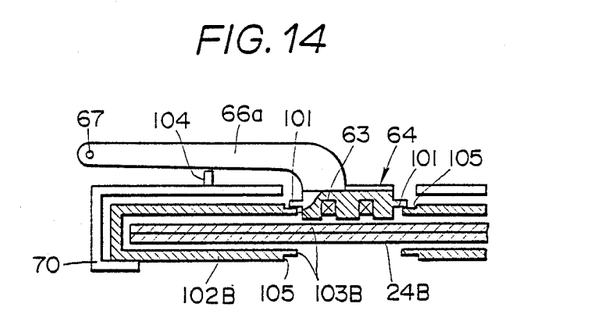
FIG. 14 shows a schematic cross section of the status of the status of a magneto-optical disk loaded at a prescribed state.

Meanwhile on the surface of the disk cartridge 102B containing the magneto-optical 24B is provided with the aperture 103B having the width D that is wider than that (shown by E) of the bottom of the said yoke 62, and also with concaved part 105, 105 that have the width M wider than that or L between the two edges 101, 101 of the said yoke 62 and is equipped to the upper part of the said aperture 135B forming a step. Hence when the disk cartridge 102B is inserted into the cartridge holder 70 and thereafter descended downward with the cartridge holder 70 and set to the prescribed loading state (see FIG. 14), the levers 66a, 66a rotate around the axis 67 and the field coil 64 descends downward, so the two protruded edges 101, 101 are stopped by the concaved surfaces 105, 105 to enable the approach of the end surface of the field coil 64 against the magneto-optical disk to apply a sufficiently intense field for the case of the recording or the erasing mode.

Figure 12:
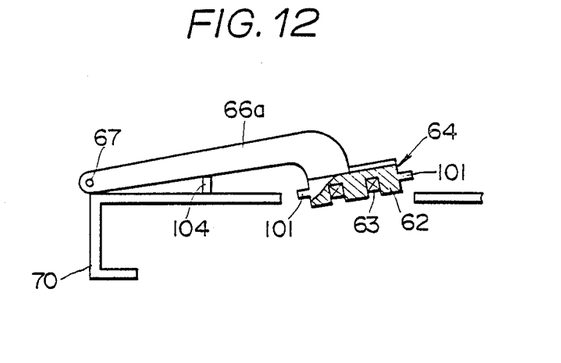
FIG. 12 shows a schematic cross section of the positional relationship between a cartridge holder and a field applying means before the insertion of a disk cartridge.

Further the field coil 64 is so provided that it is held at the sheltered position situated higher than the insertion path to which the disk cartridge 102A containing the optical disk 24A by the protruded edge 104 on the surface of the cartridge holder 70 (see FIG. 12).

Meanwhile, the protruded edge 101 is provided, for example, with a notched part having a photoreflector 106. The concaved part 105 situated on the disk cartridge 102B that contains the magneto-optical disk 24B and opposing to the said photoreflector 106, has a light reflecting part 107. Further, the part opposing to the photoreflector 106 on the disk cartridge 102A containing the optical disk 24A is so made as to absorb or not to reflect light, and using the output of the photodetector of said photoreflector 106 as a judging signal, the gain of the control circuit 57 (see FIG. 5) is controlled and the analog switch 53 of the signal processing circuit 50 is switched on and off to cope with both of the situations in which either an optical disk 24A or a magneto-optical disk 24B is loaded.

Further, in said first embodiment, an upward rotating sheltering of the field coil 64 is enabled by the shifting of the lever 71, but the present invention is not restricted by this method. For example, it is practicable that, by affixing a bar code or the like on the disk cartridge 69A, reading this bar code and supplying current to a solenoid or the like, to rotatably shelter the field coil 64.

Further, the said embodiments describe the examples of the magneto-optical disk 24B for which the field coil 24 is equipped as a field applying means, and of the optical disk 24A not requiring a field applying means, and as to this optical disk 24A, so long as it does not require a field applying means, the embodiment is not restricted with respect to its recording, reproducing, and erasing systems, but can be applied to an arbitrary system.

Further, in the said second embodiment, it is also practicable to notch obliquely the insertion end part of the cartridge 102A, 102B, or to notch obliquely the corners of the lower end of the yoke in a field applying means or the like for the sake of smoothly pushing up the field applying means in the case of loading the cartridges 102A, 102B.

Further, the field applying means can be prepared without being restricted to the field coil, and it is also practicable to form it by a permanent magnet.

Further, the present invention is applicable to the optical recording media whose track is either a concentric circle type or a spiral type. Moreover the present invention is equally applicable to the card type optical recording media.

As has been stated above, according to the present invention, a discriminating means is provided to distinguish a cartridge that contains a magneto-optical disk requiring a field applying means in a recording or erasing mode from a cartridge containing an optical disk not requiring a field applying means, and so by using this discriminating means it is possible to set at a prescribed loading state smoothly in the case of the insertion of any of said type cartridges by means of sheltering a field applying means. Therefore, a single device can load recording media of various sort, and perform recording, reproducing, and erasing corresponding to various sorts of recording media.

It is evident that, in the present invention, other different forms may be embodied in a wide range based on the invention without departing from the spirit and range thereof. The present invention is not restricted with respect to specific forms of embodiments except being limited by the affixed claims.

What is claimed is:

1. An optical recording/reproducing device, comprising:

an optical pickup means for recording/reproducing/erasing information on a recording medium through focused irradiation of a light beam on said recording medium;

a field applying means for applying a magnetic field to said recording medium when recording or erasing on a magneto-optical recording medium;

a magneto-optical cartridge containing a magneto-optical recording medium;

a moving means for movably supporting said field applying means at an operational position near said recording medium and at a non-operational position spaced apart from said recording medium;

a discriminating part formed on at least on one side of said magneto-optical cartridge and intended to judge; and a coupling means and recording medium judging means to set up the location of said field applying means intended to make variable the interval between said field applying means and recording medium in the case when said field applying means is brought close to said recording medium by said moving means based on the discriminating results obtained from the discriminating part.

2. An optical recording and reproducing device, comprising:

an optical pickup means for recording/reproducing/erasing information on a recording medium through focused irradiation of a light beam on said recording medium;

a field applying means for applying a magnetic field to said recording medium, when said recording medium is a magneto-optical recording medium; a moving means for supporting said field applying means at an operating position near to said recording medium or at a non-operating position spaced apart from said recording medium;

a judging means, having a coupling part engageable with a discriminating part formed on a magneto-optical cartridge in which said recording medium is a magneto-optical recording medium and a different discriminating part on an optical cartridge in which said recording medium is an optical recording medium, for detecting whether said recording medium is a magneto-optical recording medium or an optical recording medium, in response to the relative engagement between said coupling part and either said magneto-optical cartridge or said optical cartridge, and wherein said judging means is operatively coupled to said moving means, such that when said judging means detects a magneto-optical cartridge, said field applying means if moved to said operating position and when said judging means detects an optical cartridge, said field applying means is moved to said non-operating position.

3. The device of claim 2, also comprising:

a signal processing means, operatively coupled with said optical pickup means, for magneto-optical processing or optical processing of recording/reproducing/erasing information on said recording medium; and a selecting means, coupled to said signal processing means, for selecting said magneto-optical processing or said optical processing in response to judging whether a loaded recording medium is a magneto-optical cartridge or an optical cartridge.

4. The device of claim 3, wherein said selecting means include a photointerrupter.

5. The device of claim 3, wherein said selecting means includes a photoreflector.

6. The device of one of claims 2 or 3, wherein said discriminating part of said magneto-optical cartridge is an elongated slot extending along the loading direction of said cartridge, and said different discriminating part of said optical cartridge is an elongated slot of a different length than the slot of said magneto-optical cartridge, also extending along the loading direction of said cartridge, wherein said coupling part includes an inserting tip engageable with said elongated slots upon the loading of one of said cartridges, wherein said judging means includes a lever fixed to said inserting tip and in contact with said moving means, such that said lever moves said moving means in response to a distance said inserting tip travels along one of said slots, so that the difference in lengths of said slots causes said moving means to position said field applying means in said operating or said non-operating position.

7. The device of any one of claims 2 or 3, wherein said coupling part is a widened, protruded edge formed near an end surface of said field applying means opposing a loaded cartridge, and wherein said discriminating part of said magneto-optical cartridge includes a pair of opposing concaved edges, sufficiently spaced apart for accepting said protruded edge therebetween, and wherein said discriminating part of said optical cartridge has concaved edges which are not sufficiently spaced apart for receiving said protruding edge therebetween.

* * * * *